United States Patent [19]
Bodner et al.

[11] 3,961,312
[45] June 1, 1976

[54] CYCLE INTERLEAVING DURING BURST MODE OPERATION

[75] Inventors: Ronald Eugene Bodner; Thomas L. Crooks; John E. Guest, all of Rochester, Minn.; Israel B. Magrisso, Coral Springs, Fla.; Keith K. Slack, Rochester, Minn.

[73] Assignee: International Business Machines Corporation, Armonk, N.Y.

[22] Filed: July 15, 1974

[21] Appl. No.: 488,349

[52] U.S. Cl. ............................................. 340/172.5
[51] Int. Cl.² .......................................... G06F 3/00
[58] Field of Search ................. 340/172.5; 445/1; 179/15

[56] References Cited
UNITED STATES PATENTS

| | | | |
|---|---|---|---|
| 3,500,466 | 3/1970 | Carleton | 340/172.5 |
| 3,599,176 | 8/1971 | Cordero et al. | 340/172.5 |
| 3,668,651 | 6/1972 | Hornung | 340/172.5 |
| 3,680,054 | 7/1972 | Bunker et al. | 340/172.5 |
| 3,735,357 | 5/1973 | Maholick et al. | 34.0/172.5 |
| 3,749,845 | 7/1973 | Fraser | 179/15 AL |
| 3,810,114 | 5/1974 | Yamada et al. | 340/172.5 |

*Primary Examiner*—Mark E. Nusbaum
*Attorney, Agent, or Firm*—Donald F. Voss

[57] ABSTRACT

Control circuitry in a computer system is responsive to an allow cycle steal signal from an I/O attachment operating in a burst or dedicated data transfer mode and generates control signals whereby the next data storage cycle is made available to an I/O device which is also capable of operating in a cycle steal mode. Upon completion of the next storage cycle, the operation reverts to burst mode and the I/O attachment operating in the burst mode is granted ensuing data storage cycles until it relinquishes a storage cycle to an I/O device capable of using and having a need for it.

12 Claims, 15 Drawing Figures

CYCLE INTERLEAVING DURING BURST MODE OPERATION

BACKGROUND OF THE INVENTION

1. Field of the Invention

This invention relates to computer systems and more particularly to computer systems where Input/Output (I/O) devices attached to the central processing unit (CPU) are serviced on a cycle steal basis and still more particularly to such computer systems where at least one of the I/O devices is serviced in a dedicated mode where the CPU grants as many successive cycle steals as the I/O device requires and where the I/O device operating in the dedicated mode relinquishes cycle steals to another I/O device.

2. Description of the Prior Art

I/O devices operating in a dedicated mode on a cycle steal basis often have a data rate which is different from the rate at which data storage access cycles are available. Hence, data transferred from storage to the I/O device via the CPU may be lost if the I/O device cannot use it fast enough. The prior art approach to the solution of this problem has been to buffer the data in the control unit controlling the I/O device. The amount of buffering required can become considerable whenever there is a significant difference in data rates.

The buffering approach can be expensive and wasteful of system resources. In the present invention there is a limited amount of buffering, one stage, and the control unit for the I/O device is so structured that it groups cycle steal requests and relinquishes a cycle steal between groups whereby controls are switched to enable the granting of this relinquished cycle steal to another I/O device. Thus, the present invention reduces the amount of buffering which would otherwise be necessary and also frees up system resources for another I/O device which may be wanting service and thereby improving the overall efficiency of the computer system.

SUMMARY OF THE INVENTION

The principal objects of the invention are to provide improved control apparatus in a computer system for servicing I/O devices with some operating in a dedicated mode and others operating in a non-dedicated mode which:

a. services the I/O device operating in the dedicated mode in a manner to periodically relinquish storage access cycles to I/O devices operating in a non-dedicated mode;

b. improves the overall performance and efficiency of the computer system, and c. is relatively inexpensive.

The foregoing objects are achieved by having the control unit for the I/O device operating in the dedicated or burst mode group the storage access requests or cycle steals so as to open up a time slot to make a storage request available to an I/O device capable of using the storage cycle but not requiring successive storage cycles. The relinquished storage cycle is either taken by another I/O device or it goes unused. In any event at the completion of the cycle, control reverts to the dedicated mode and another group of storage cycles are taken by the I/O device operating in the dedicated mode. The control unit for operating the I/O device in the dedicated mode also relinquishes storage cycles whenever it is unable to use them such as during the time it is becoming synchronized with its attached I/O device.

DESCRIPTION

Figure 1:
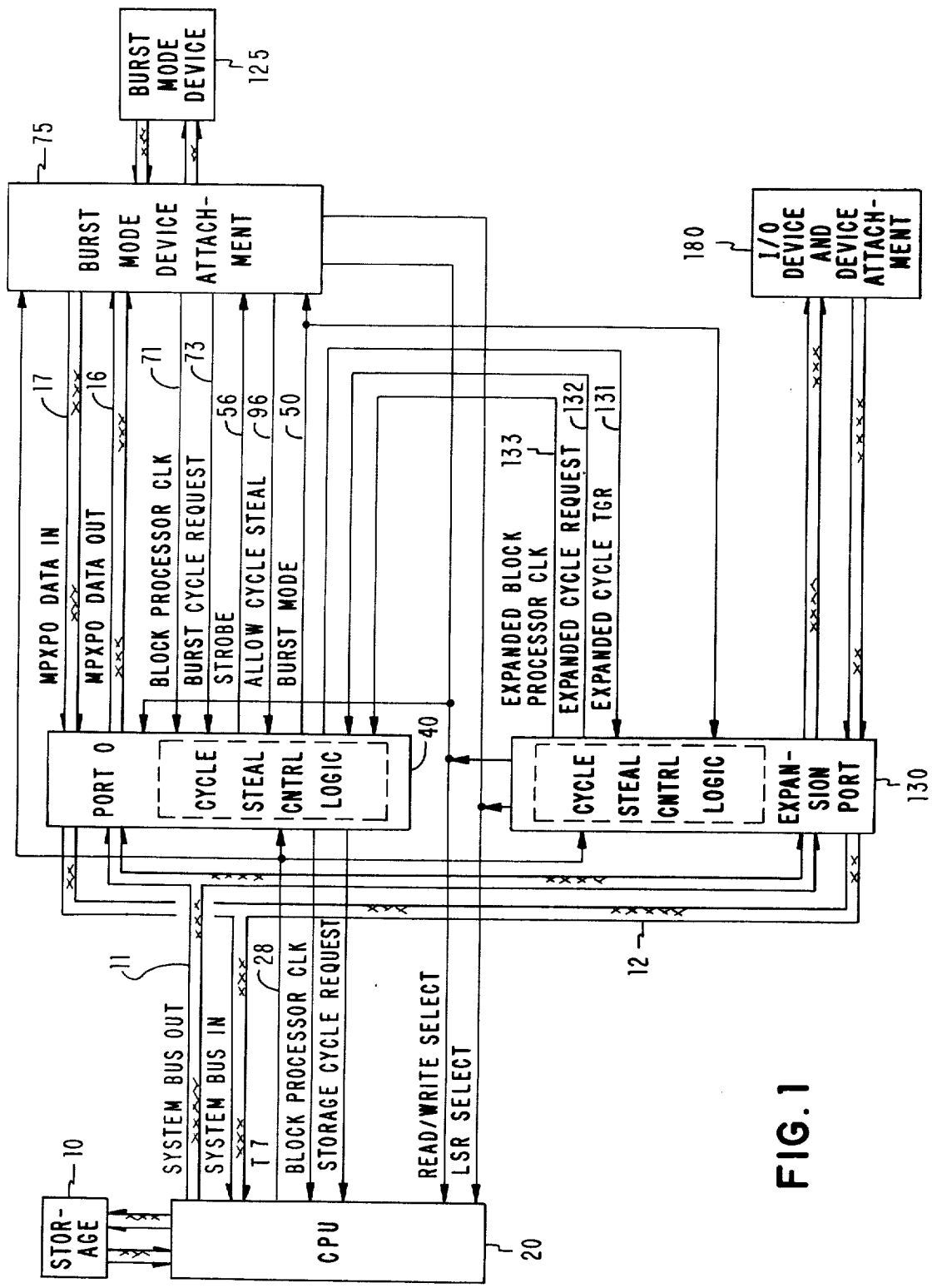
FIG. 1 is a block diagram of a computer system incorporating the invention.

With reference to the drawings, and particularly to FIG. 1, the invention is illustrated by way of example as being incorporated into a computer system including storage 10, a central processing unit 20 for transferring data to and from storage 10, port 40 connected between CPU 20 and burst mode device attachment 75, burst mode device 125 connected to the burst mode attachment 75, and port 130 connected between CPU 20 and I/O device and attachment 180. Data is sent from CPU 20 to ports 40 and 130 over system bus out 11. Similarly, data from ports 40 and 130 is transferred to CPU 20 over system bus in 12. Busses 11 and 12 consist of lines for eight bits of information in byte form plus a parity bit. In addition to busses 11 and 12, there are several control lines connected between CPU 20 and ports 40 and 130. These control lines will be described in detail in connection with FIG. 2. Burst mode is defined in terms of the manner in which data transfers between main storage and an I/O device. In burst mode, the I/O device has exclusive use of the I/O interface and no other I/O device can transfer or receive information over the interface.

Figure 2A:
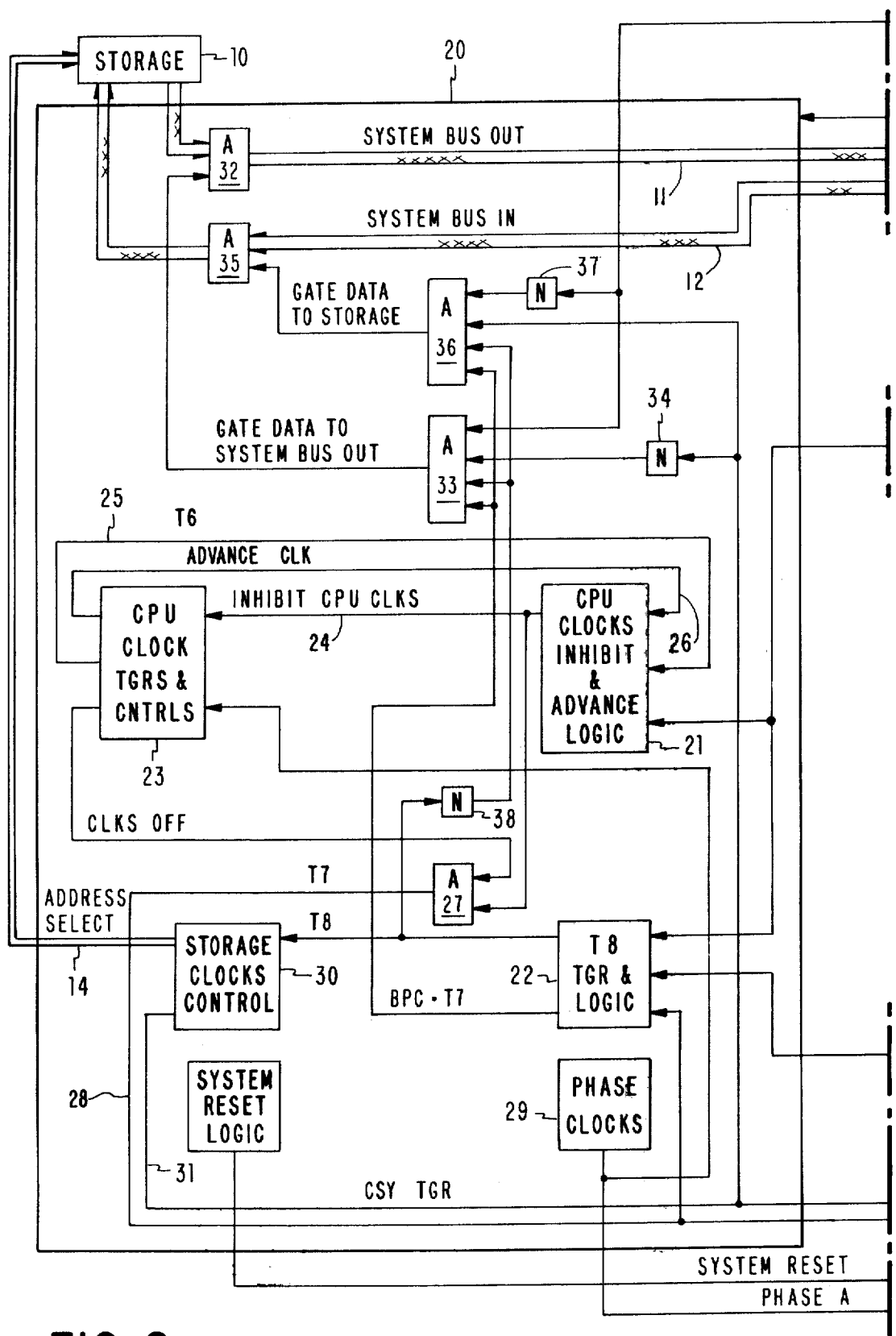
FIGS. 2a, 2b and 2c taken together as shown in FIG. 11 are a schematic logic diagram illustrating the control circuitry for burst mode and cycle steal control.
Figure 2B:
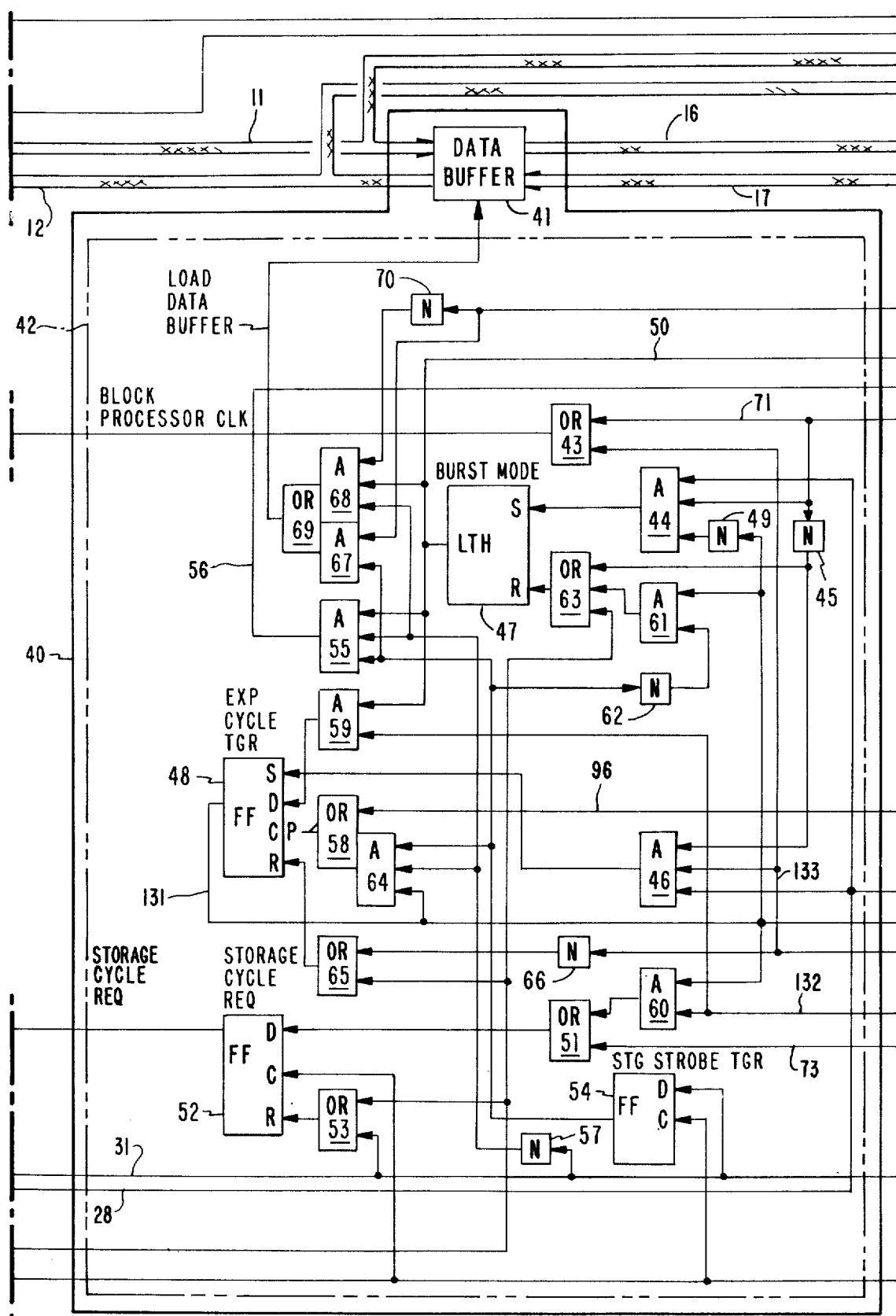
Figures 2C, 11:
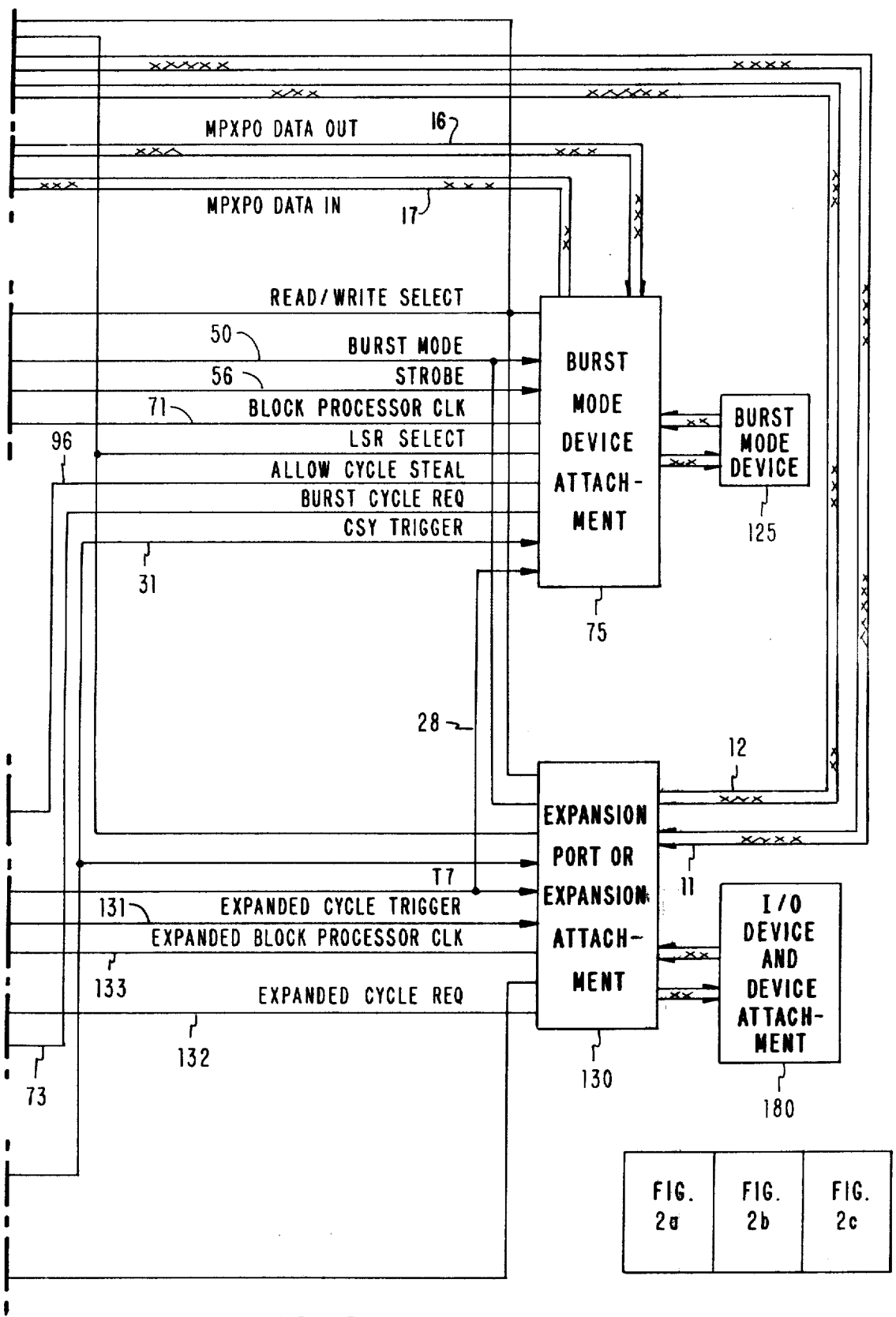
FIG. 11 is a diagram illustrating the arrangement of FIGS. 2a, 2b and 2c.

Port 40, FIG. 2, includes data buffer 41 for buffering data a byte at a time and burst mode and cycle steal control logic 42.

Data buffer 41 functions to temporarily store a byte of data transferred from storage 10 via AND circuits represented by AND circuit 32. AND circuit 32 is conditioned by the output of AND circuit 33 which has an output whenever data is to be transferred to system bus out 11. AND circuit 33 includes an input from inverter 34 which has an output whenever a CSY TRG signal, to be described later herein, is absent. The byte of data in this instance is loaded into buffer 41 under control of the burst mode and cycle steal control logic 42 and more specifically under control of AND circuit 67 via OR circuit 69. The byte of data in buffer 41 can then be transferred to burst mode device attachment 75. It should be noted that the same byte of data can be transferred from CPU 20 to expansion port 130. The controls within expansion port 130 would determine whether or not the byte would be loaded.

Data buffer 41 also temporarily stores a byte of data coming from burst mode device attachment 75. In this instance buffer 41 is loaded under control of inverter 70, and AND circuit 68 via OR circuit 69. The data in buffer 41 is transferred to storage 10 via AND circuits represented by AND circuit 35 in CPU 20. AND circuit 35 is conditioned by the output of AND circuit 36 which among other inputs receives inputs from inverters 37 and 38.

The bytes of data entered into buffer 41 from data storage 10 can be commands for operating the burst mode device 125 or data to be used by the burst mode device 125. Burst mode device 125 is any I/O device capable of operating at a high data rate such as a disk storage drive. A disk storage drive functions to read, write and scan data on a magnetic disk. The read, write and scan commands originate under program control in CPU 20 and are transferred via port 40 to the burst mode device attachment 75. The burst mode device 125 or storage disk drive is of the type well known in the art of disk storage drives. Once the program issues well known read, write or scan commands, the burst mode device attachment 75 operates the disk storage drive 125 in a dedicated mode; except that it will relinquish storage cycles which it cannot use. This permits another I/O device such as I/O device and attachment 180 which is also capable of operating in a cycle steal mode to capture the relinquished storage cycle. The I/O device and attachment 180 is shown as being attached to expansion port 130; however, it could have been attached to port 40.

Figure 3A:
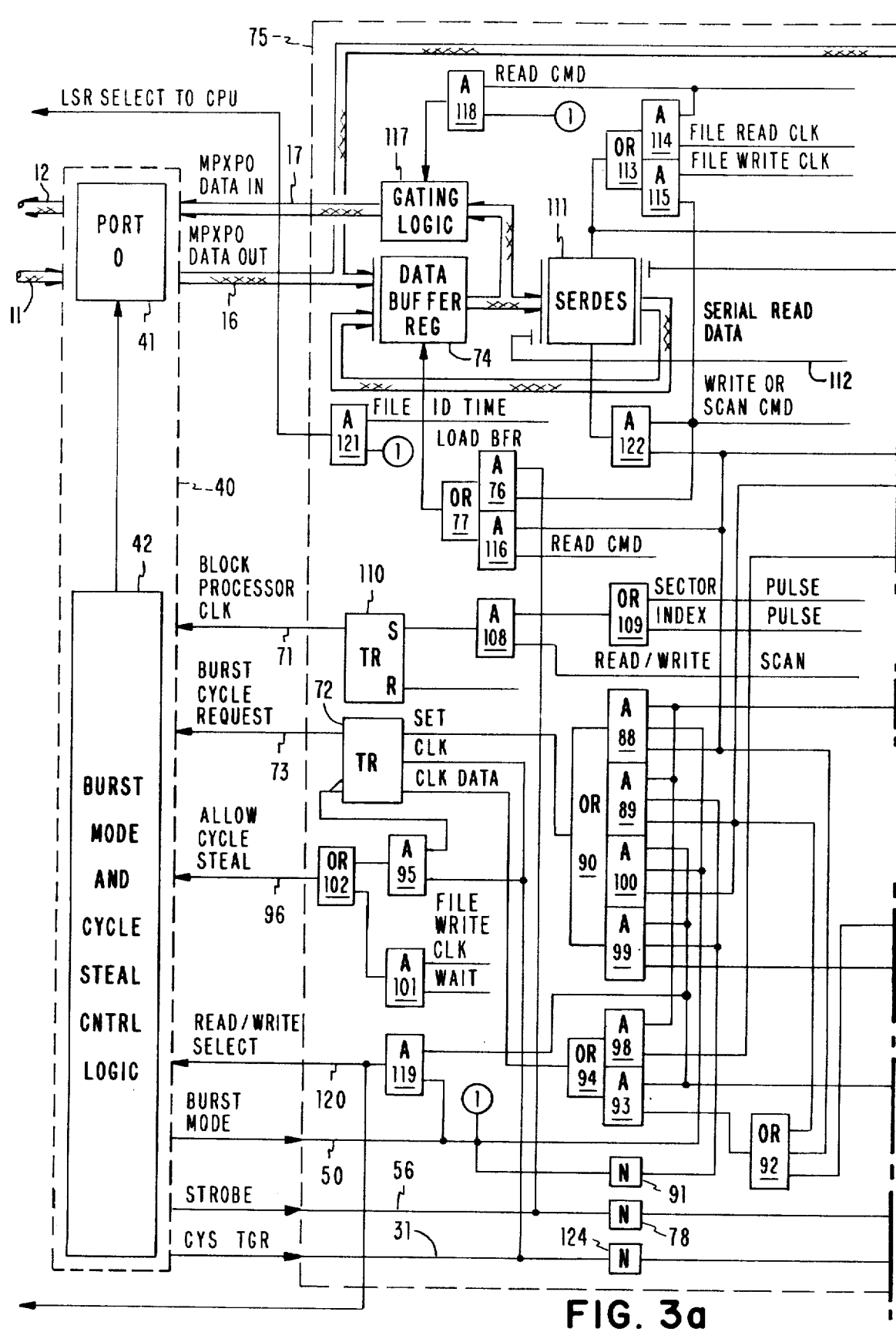
FIGS. 3a and 3b with FIG. 3a disposed to the left of FIG. 3b are a schematic logic diagram illustrating control circuitry of the dedicated or burst mode device adapter.
Figure 3B:
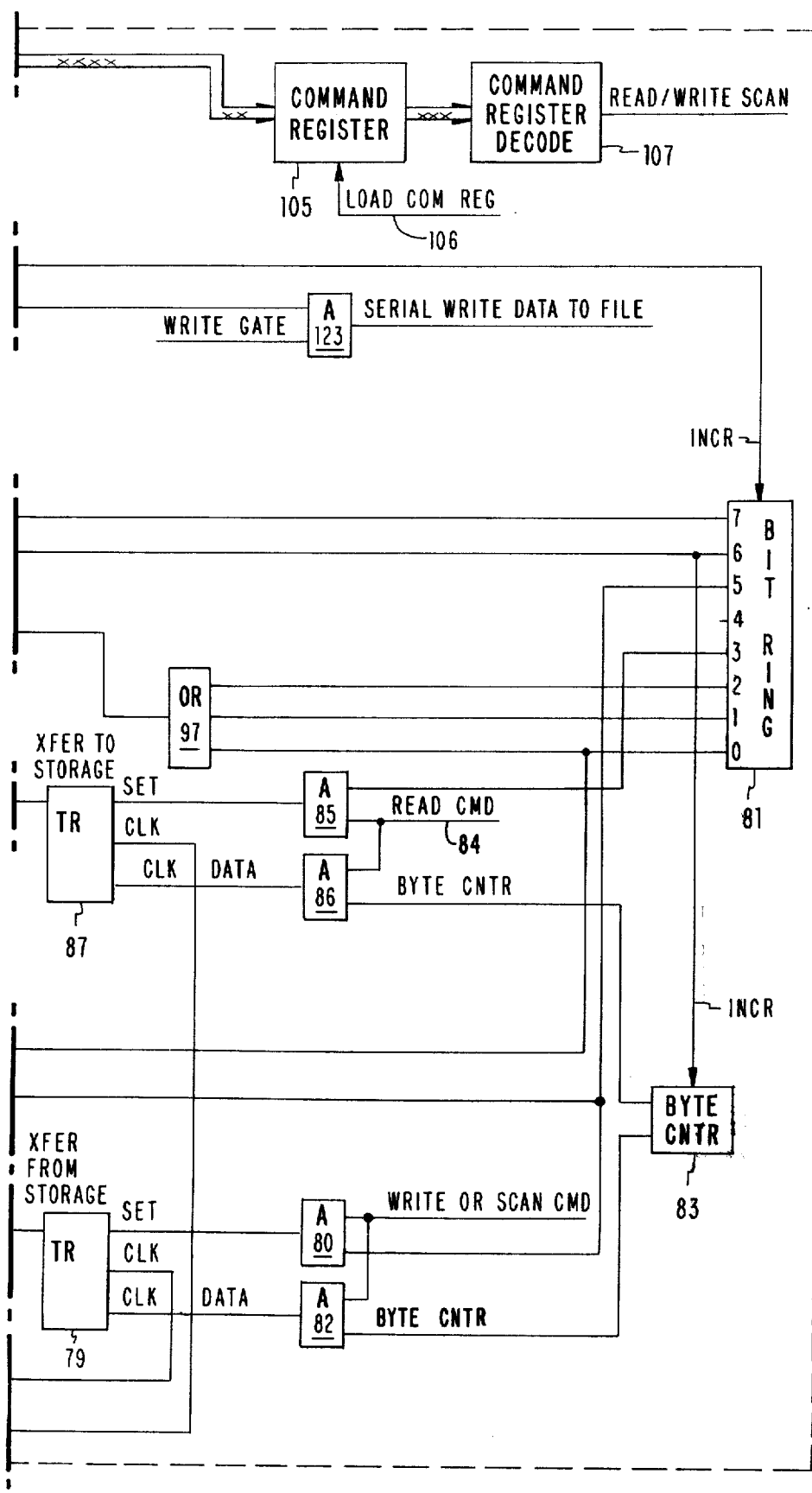

The commands received by the burst mode device attachment 75 via port 40 are entered into command register, FIG. 3, under control of a load command register signal on line 106. The command is decoded as a read, write or scan command by command register decode 107. The decoded command is applied to AND circuit 108 which upon receiving a signal from OR circuit 109 sets trigger 110. The set output of trigger 110 is a block processor clock signal. Thus, the burst mode device attachment 75 responds to the command by generating a block processor clock signal on line 71, FIGS. 2 and 3, which is applied to OR circuit 43, AND circuit 44 and inverter 45 of the burst mode and cycle steal control logic 42, FIG. 2.

The block processor clock signal is passed by OR circuit 43 to CPU clocks inhibit and advance logic 21 and to T8 trigger 22 in CPU 20. The CPU clock inhibit and advance logic includes conventional AND/OR logic for performing logical functions to determine when the CPU clock and controls 23 can be stopped and started. CPU clock and controls 23 includes triggers for generating time states T0–T6 inclusive. These time states are used within the CPU for various functions including the fetching and execution of instructions. The address register, operation code register, storage data register, condition register, local storage register (LSR's) and other storage registers within the CPU used for instruction fetching and executing are not shown in order to reduce the number of drawings and description; however, CPU 20 includes the conventional apparatus for operating the computer system under program control. Thus, CPU clocks inhibit and advance logic 21 provides a signal on line 24 for inhibiting CPU clock 23 after an instruction has been completed. This action places the operation in a dedicated mode.

Clock 23 provides a T6 time signal on line 25 and an advance clock signal on line 26 to the CPU clocks inhibit and advance logic 21 to signal this logic as to when it can stop and start the clock. The reason for providing both the T6 signal and the advance clock signal to the CPU clocks inhibit and advance logic 21 is that some instructions are performed with the clock advancing through the states T0–T6 inclusive and some instructions are performed without the clock advancing to the T6 state and in this instance the advance clock signal is sent to the CPU clocks inhibit and advance logic 21. With the CPU clock 23 stopped, it provides a clock off signal to AND circuit 27 which also receives a signal from the CPU clock inhibit and advance logic 21. AND circuit 27 is responsive to these signals and passes a time signal T7 on line 28 to trigger 22 within CPU 20, to AND circuits 44 and 46 within burst mode and cycle steal control logic 42, to burst mode device attachment 75 and to expansion port 130.

Trigger 22 is not set immediately but the T7 signal passed by AND circuit 27 provides a conditioning signal. The burst mode and cycle steal control logic 42 is responsive to the T7 signal whereby latch 47 is set via AND circuit 44. AND circuit 44 had been conditioned by the block processor clock signal from burst mode device attachment 75 and by the absence of an expanding cycle trigger signal on line 131 from expanded cycle trigger 48. Inverter 49 is responsive to the absence of the expanded cycle trigger signal to provide conditioning signal to AND circuit 44. The signal from the disk burst mode latch 47 is sent on line 50 to the burst mode device attachment 75 to indicate that it can request storage cycles. Whether or not the burst mode device attachment 75 requests storage cycle at this time, depends upon if it is operating in a state whereby it could immediately use the storage cycles.

Figure 5:
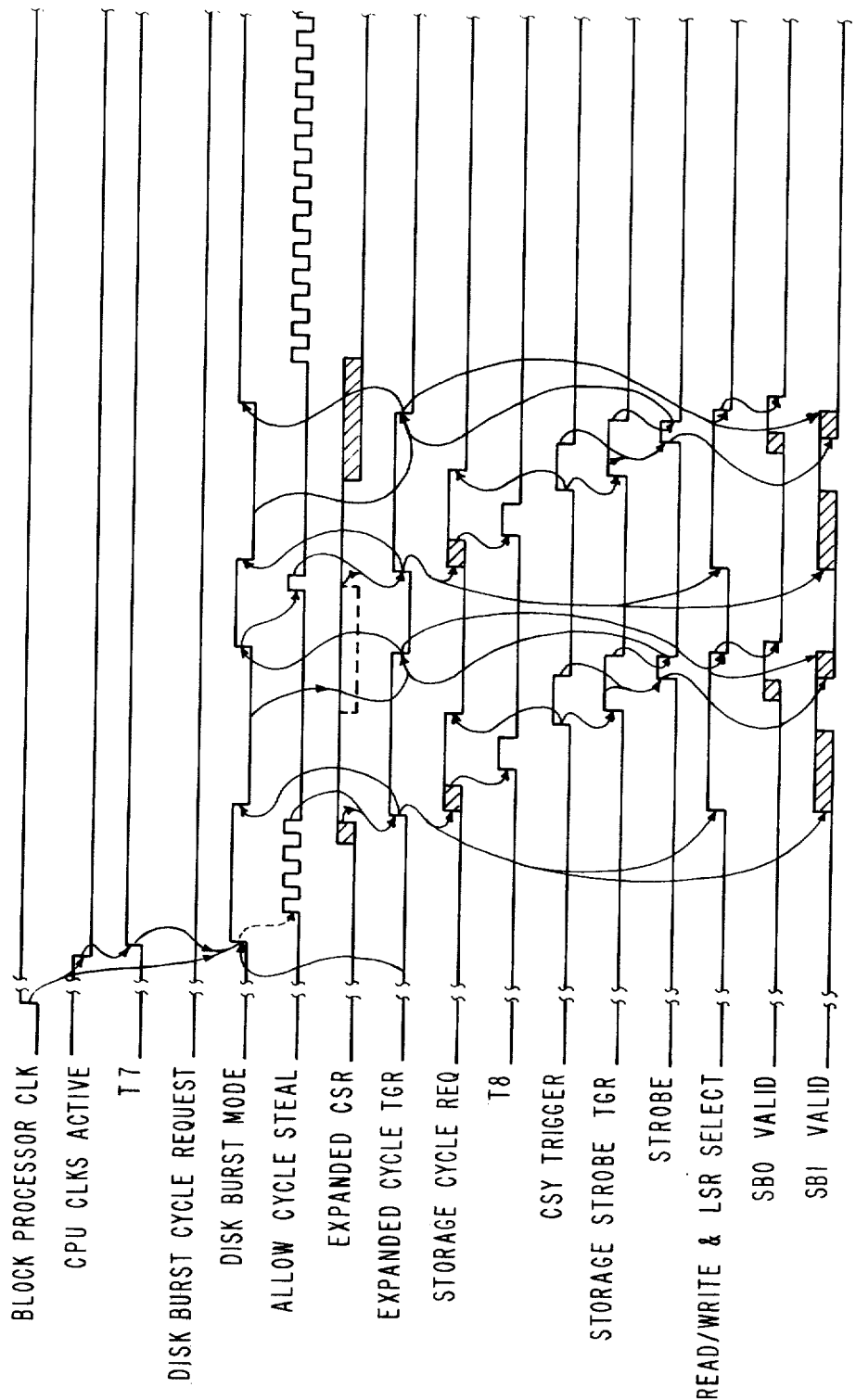
FIG. 5 is a timing diagram illustrating timing relationships where the burst mode device attachment is in the dedicated mode but is not ready to transfer or accept data.

The timing diagram of FIG. 5 illustrates the condition where the burst mode device attachment 75 is unable to use the storage cycles. The storage cycles are relinquished by generating allow cycle steal signals via AND circuit 101 and OR circuit 102, FIG. 3, to yield the storage cycles to the expansion port 130.

The allow cycle steal signals are passed from burst mode device attachment 75 to OR circuit 58 in the burst mode and cycle steal control logic 42. The output of OR circuit 58 is connected to the clock input of trigger 48. The data input to trigger 48 is conditioned by the output of AND circuit 59 prior to the end of the allow cycle steal signal. AND circuit 59 passes a signal in response to the expanded cycle request signal on line 132 and the disk burst mode signal on line 50. Trigger 48 when set provides an expanded cycle trigger signal on line 131 to expansion port 130. If trigger 48 is set in response to an expanded cycle request signal on line 132 from expansion port 130, storage cycle request trigger 52 is set via AND circuit 60 and OR circuit 51 whereby a storage cycle request signal is sent to CPU 20.

The storage cycle request signal sets T8 trigger 22 to initiate a storage cycle via storage clocks control 30. The storage cycle is taken by expansion port 130. During this time latch 47 is reset by the outputs of trigger 48 and inverter 62 via AND circuit 61 and OR circuit 63. Thus the operation transfers from the burst mode to the expanded cycle mode and after the storage cycle is completed, the operation reverts to burst mode by setting latch 47 via AND circuit 44. The trigger 48 is reset at the end of the storage cycle because its data input from AND circuit 59 is not satisfied and the next clock pulse through OR circuit 58 via AND circuit 64 causes the reset. Although in this particular embodiment only one storage cycle is relinquished, more than one storage cycle could be relinquished if the speed difference between data storage 10 and the burst mode device 125 were such that attachment 75 could be designed so as to relinquish more than one storage cycle. For example, if the storage cycle were twice as fast and the speed of burst mode device 125 remained the same, then at least two storage cycles could be relinquished.

If the burst mode device attachment 75 is still not ready to use the next storage cycle, the operation repeats in the manner described. However, if the burst mode device attachment 75 can utilize the next storage cycle, it sets the burst cycle request trigger 72, FIG. 3, in burst mode device attachment 75. The burst cycle request signal on line 73 is passed by OR circuit 51 to the data input of the storage cycle request trigger 52 which then becomes set as the phase A signal from phase clocks 29 is applied to the clock input of trigger 52. The output from trigger 52 is applied to T8 trigger and logic 22 to set the trigger portion thereof. T8 trigger and logic 22 is shown as including a trigger and logic to provide a T8 time signal to storage clocks control 30 together with a logic signal formed by the AND of the block processor clock signal and the T7 time state signal.

The storage clocks control 30 provides address select signals on bus 14 to storage 10. The storage clocks 30 also provide a CSY trigger signal on line 31 to reset the storage cycle request trigger 52 via OR circuit 53. This signal also provides the data input to the storage strobe trigger 54 which is clocked by the phase A signal from phase clocks 29. The CSY trigger signal on line 31 also is sent to the burst mode device attachment 75 and the expansion port 130 to indicate that a storage cycle is in progress. The storage strobe trigger which is now set provides a signal to AND circuit 55. AND circuit 55 is conditioned at this time by a signal from the disk burst mode latch 47 and when the CSY trigger signal becomes inactive, inverter 57 provides a signal whereby AND circuit 55 passes a strobe signal on line 56 to the burst mode device attachment 75. The strobe signal is a timing signal used by the burst mode device attachment 75 for loading data into data buffer register 74 if a write or scan operation is taking place. The write or scan command signal is applied to AND circuit 76 together with the strobe signal on line 56. The output of AND circuit 76 is passed by OR circuit 77 to control the loading of data buffer register 74.

When the strobe signal on line 56 terminates, a signal is provided via inverter 78 to the clock input of trigger 79. This clock input is for resetting the trigger 79 which had been DC set via AND circuit 80. AND circuit 80 has an input for receiving a write or scan command and an input from position 5 of bit ring 81. The transfer from storage trigger 79 however cannot be reset until AND circuit 82 provides a clock data signal. AND circuit 82 only provides the clock data signal when byte counter 83 indicates that the necessary storage cycles have been taken.

Storage cycles, of course, are also taken during a read mode however, in that instance, data is being transferred from the burst mode device attachment 75 to storage. In this latter instance, a read command is applied to line 84 for conditioning AND circuit 85. AND circuit 85 also receives a signal from position 3 of bit ring 81 whereby it provides an output signal for setting the transfer to storage trigger 87. The set output of trigger 87 conditions AND circuits 88 and 89, respectively.

AND circuit 88 is conditioned by the burst mode signal on line 50 and by a signal from position 7 of bit ring 81. Thus, AND circuit 88 will pass a signal via OR circuit 90 to set trigger 72. AND circuit 89 is not conditioned at this time because it requires a not burst mode signal from inverter 91 and a signal from position six of bit ring 81. The not burst mode signal from inverter 91 would not be present if a burst mode signal is present on line 50. Thus, it is seen that as long as trigger 72 is set, a burst cycle request signal will be available on line 73. The burst mode device attachment 75 is designed so that storage cycle requests are grouped whereby every fourth storage cycle is relinquished. This is accomplished by resetting trigger 72 at the appropriate time.

If the storage cycle taken by the burst mode device attachment 75 occurred during bit ring 6, 7 or 0 time, there is sufficient time to yield the next storage cycle and make a storage cycle request for the ensuing storage cycle without losing any data. Thus, the positions 0, 6, and 7 from bit ring 81 are applied to OR circuit 92 and its output is applied to AND circuit 93. The output of AND circuit 93 is applied via OR circuit 94 to the clock data input of trigger 72 whereby trigger 72 is reset by the CSY trigger signal on conductor 31. With trigger 72 reset, it provides a conditioning signal to AND circuit 95 which also receives the CSY trigger signal on conductor 31. The output of AND circuit 95 is an allow cycle steal signal. This signal is applied through OR circuit 102 over line 96 to the burst mode and cycle steal control logic 42.

If the storage cycle request had been made for transferring data to storage, trigger 72 would be reset under control of OR circuit 97 which receives inputs from positions 0, 1 and 2 of bit ring 81. The output of OR circuit 97 is applied to an input of AND circuit 98 which also receives an input from the set output of trigger 87. The output of AND circuit 98 is applied to the clock data input of trigger 72 via OR circuit 94.

If the yielded cycle is used by expansion port 130, the burst mode signal on line 50 is dropped and thus inverter 91 conditions AND circuits 89 and 99. AND circuit 89 as previously mentioned is conditioned by the set output of the transfer to storage trigger 87. AND circuit 99 is conditioned by the set output of the transfer from storage trigger 79. Thus, either AND circuit 89 or 99 will be conditioned depending upon the direction of data transfer. However, AND circuit 89 does not pass a signal for setting trigger 72 until bit ring 6 time. AND circuit 99 passes a signal at bit ring 5 time. If the expanded cycle had not been taken, the burst mode signal is continuously present on line 50 and the trigger 72 would be set either via AND circuit 88 or AND circuit 100 depending upon whether trigger 87 or 79 were set respectively. Note that AND circuit 88 is conditioned at bit ring 7 time whereas AND circuit 100 is conditioned at bit ring 6 time. It should also be noted that there is a difference in time as to when the next storage cycle is requested depending upon whether or not the allowed cycle had been used by the expansion port 130.

As previously indicated, there are times when the burst mode device attachment 75 is unable to use storage cycles. These times are primarily when the disk storage drive clocks are becoming synchronized. During this time, the burst mode device attachment 75 generates a wait signal which is applied to AND circuit 101. The disk storage drive 125 provides a file write clock signal to AND circuit 101 which then provides an output via OR circuit 102 in the form of an allow cycle steal signal.

From the foregoing it is seen that the burst mode device attachment 75 will allow cycle steals by other I/O devices whenever it is unable to use the next available storage cycle. Further it is seen that the sequence for requesting storage cycles starts whenever there is a read, write or scan command. These commands result from executing the program in the CPU 20. The CPU 20 sends out a command on system bus out 11 to port 40. The command is held in data buffer 41 and is applied therefrom over MPXPO data out bus 16 to the data buffer register 74 and to a command register 105. Data buffer register 74 is not loaded at this time because there will not be a load buffer command from OR circuit 77. Command register 105 is loaded because the burst mode device attachment 75 will provide a load command register signal on line 106. The contents of command register 105 are decoded by command register decode logic 107. Actually, decode logic 107 will provide a plurality of different commands, but for the sake of simplicity, it is shown that it only provides a read, write or scan command. Any of these commands are then applied to AND circuit 108 which receives an input from OR circuit 109 and its output is used to set trigger 110 to provide a block processor clock signal on line 71. OR circuit 109 receives a sector pulse and an index pulse from the disk storage drive 125.

If the command were a read command, for example, data is being read from the disk storage drive and entered into a serializer/deserializer, Serdes 111 over line 112. The data enters Serdes 111 a bit at a time. As each bit is entered into Serdes 111 it is shifted under control of OR circuit 113 which has inputs from AND circuits 114 and 115. AND circuit 114 is providing the shift signal at this time because it receives a read command signal and a file read clock signal from the disk storage drive 125. If the operation had been a write command, then AND circuit 115 would be providing the shift signal for shifting data out of Serdes a bit at a time.

After a byte of data has been assembled in Serdes 111 during a read operation, it is transferred to data buffer register 74 under control of a load buffer signal from AND circuit 116 via OR circuit 77. AND circuit 116 receives a signal from position 7 of bit ring 81 and a read command signal. The byte of data in buffer register 74 is then transferred into register 41 via gating logic 117 which is conditioned by AND circuit 118. The loading of register 41 is under control of OR circuit 69 in burst mode and cycle steal control logic 42, FIG. 2. AND circuit 118, FIG. 3, receives read commands and a burst mode signal on line 50. The CPU 20 and port 40 are informed of the direction of data transfer by AND circuit 119. This AND circuit receives a burst mode signal on line 50 and a signal from the output of the transfer from storage trigger 79. Thus, if the AND circuit 119 is providing a read/write select signal on line 120, CPU 20 and port 40 know that the data is being transferred from the CPU 20 to the burst mode device attachment 75. If the read/write select signal is absent on line 120, CPU 20 and port 40 know that data is being transferred from the burst mode device attachment 75 to the CPU 20.

The storage addresses are contained in local storage registers (LSR's) not shown, in CPU 20. The local storage registers are the type well known in the art and included in existing computer systems. The selection of the LSR's containing the storage addresses is accomplished by means of AND circuit 121. AND circuit 121 receives a burst mode signal on line 50 and a file ID time signal from within the burst mode device attachment 75. The output of AND circuit 121 is a LSR select signal which is sent directly to CPU 20 to select the proper LSR register containing the desired storage address. The byte of data register 41 then transfers over system bus in 12 to CPU 20 and entered into storage 10 at the location indicated by the address in the selected LSR. Addressing actually takes place by transferring the address from the selected LSR to a storage address register (not shown).

If the command had been a write command, the byte or bytes of data to be written by the disk storage drive 125 would have been addressed in storage 10 and transferred via CPU 20 to port 40 into register 41 over system bus out 11. The byte of data in register 41 would transfer over bus 16 and be entered into data buffer register 74 under control of AND circuit 76 through OR circuit 77 which provides a signal for loading the buffer when the write operation is to take place. The byte of data in buffer register 74 transfers to Serdes 111 under control of AND circuit 122 which receives a write or scan command signal and a signal from position 7 of bit ring 81. Data is then shifted out of Serdes 111, a bit at a time, under control of AND circuit 115 through OR circuit 113. As each bit of data is shifted out of Serdes 111, it is applied to AND circuit 123 which is conditioned by a write gate signal from within attachment 75. The bit of data passed by AND circuit 123 is then applied to the write circuitry of the disk storage drive 125.

It should be noted that byte counter 83 keeps track of the number of bytes which should be read or written during a read or write operation. When the proper number of bytes have been written by the disk storage drive 125, byte counter 83 applies a signal to AND circuit 82 which conditions trigger 79 for resetting. The transfer from storage trigger 79 is then reset when inverter 78 applies a signal to the clock input of trigger 79. Similarly, during a read operation after the proper number of bytes have been read from the disk on the disk storage drive 125, byte counter 83 provides a signal to AND circuit 86 which conditions the transfer to storage trigger 87 for resetting. Trigger 87 is then reset when the CSY trigger signal on line 31 is no longer present. Inverter 124 is responsive to the absence of the CSY trigger to provide a signal for resetting trigger 87.

Assuming that either AND circuit 95 or AND circuit 101 has an output to OR circuit 102, then an allow cycle steal signal is available on line 96 and this signal is applied to OR circuit 58, FIG. 2. The output of OR circuit 58 provides a clock signal for setting the expanded cycle trigger 48. The expanded cycle trigger 48 is conditioned for setting by a signal from AND circuit 59. AND circuit 59 has an input for receiving an expanded cycle request signal from expansion port 130 over line 132 and an input from the disk burst mode latch 47. It should also be noted that the expanded cycle trigger 48 also can be set via AND circuit 46 when expansion port 130 is operating in the cycle steal mode and the burst mode device attachment 75 is not in the burst mode. The expansion port 130 provides an expanded block processor clock signal on line 133 to AND circuit 46 and to OR circuit 43. AND circuit 46 is also receiving a T7 signal from AND circuit 27 and a signal from inverter 45.

Burst mode device attachment 75 would not be providing a block processor clock signal at this time. The output of the expanded cycle trigger 48 is also used for resetting the disk burst mode latch 47. This is accomplished via AND circuit 61 which receives an input from the expanded cycle trigger 48 and an input from inverter 62. Inverter 62 is connected to the output of storage strobe trigger 54. The output of AND circuit 61 is applied to OR circuit 63 to reset the disk burst mode latch 47. The storage cycle request trigger 52 is set in this instance under control of AND circuit 60 which has an input for receiving the expanded cycle request signal and an input for receiving the expanded cycle request signal and an input for receiving the expanded cycle trigger signal on line 131. With the storage cycle request trigger 52 set, the T8 trigger and logic 22 will be set and a storage cycle will be taken in the manner previously described. The CSY trigger signal will provide the data input to the storage strobe trigger 54 which will be set on the trailing edge of the phase A clock pulse. When the CSY trigger signal is no longer present, trigger 54 is reset by the phase A clock pulse.

Inverter 57 is responsive to the absence of the CSY trigger signal to provide a signal to AND circuit 64 which also receives a signal from trigger 54 and the expanded cycle trigger signal from expansion port 130. The output of AND circuit 64 provides a clock input to expanded cycle trigger 48 via OR circuit 58. The data input of trigger 48 will not be present at this time because the disk burst mode latch 47 has been reset and therefore the conditions of AND circuit 59 are not met. Thus, the expanded cycle trigger 48 becomes reset by the clock signal from AND circuit 64. With the expanded cycle trigger 48 reset, AND circuit 44 is conditioned via inverter 49 and the burst mode device attachment 75 can immediately set the disk burst mode latch 47 so as to take the next storage cycle. Had burst mode device attachment 75 not resumed operation in a burst mode, the expanded cycle trigger 48 would become reset via OR circuit 65 when the expansion port 130 no longer provides an expanded block processor clock signal on line 133. Under this condition, inverter 66 provides the signal for resetting expanded cycle trigger 48.

From the foregoing it is seen that the present invention enables the I/O device and attachment 180 via expansion port 130 to acquire storage cycles during both burst mode and non-burst mode operations. When burst mode device attachment 75 is operating in the burst mode, I/O device and attachment 180 is permitted a storage cycle whenever the attachment 75 provides an allow cycle steal signal. If the attachment 75 is not in the burst mode, I/O device and attachment 180 can request and receive storage cycles on its own via ports 130 and 40.

Figure 4A:
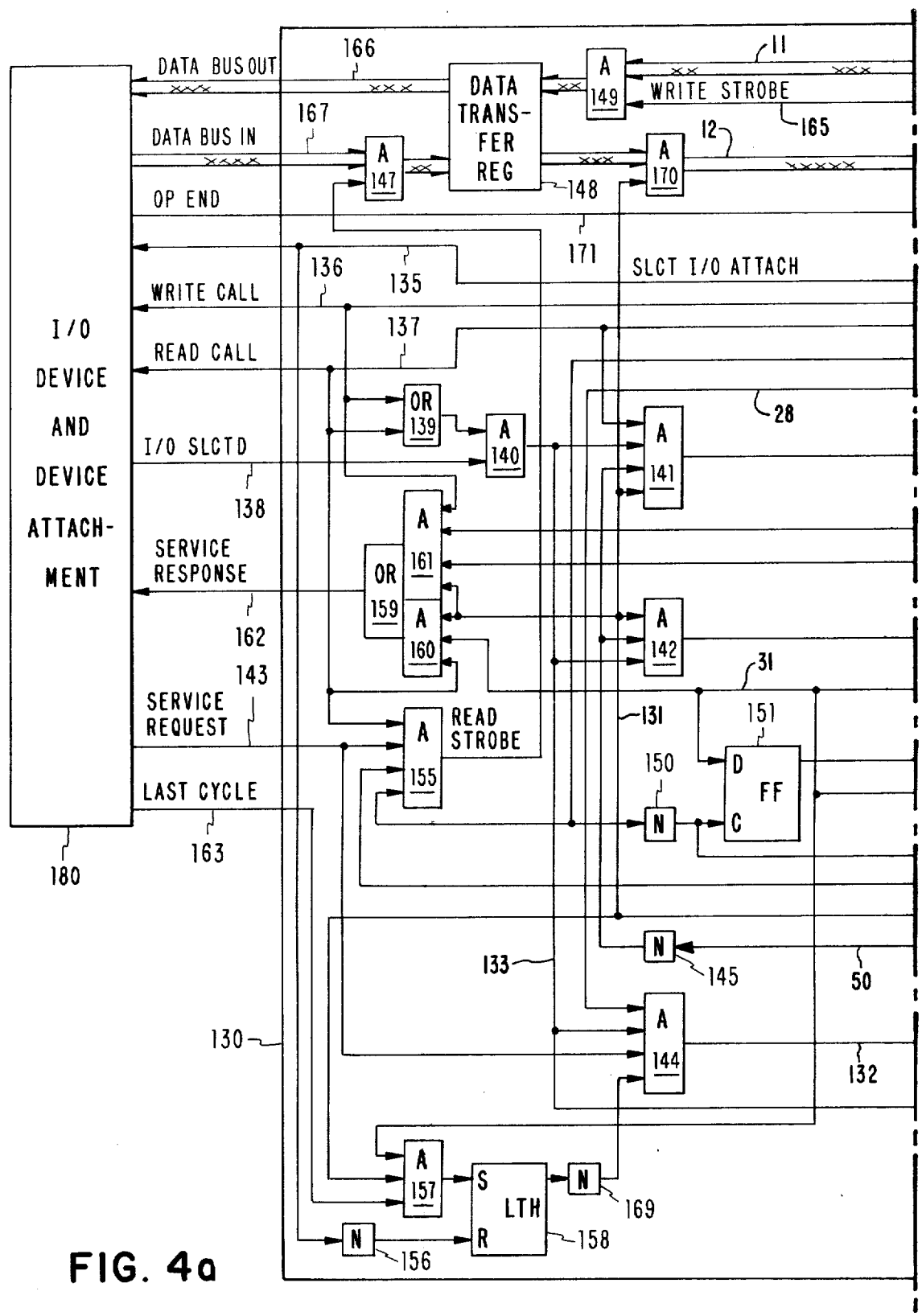
FIGS. 4a and 4b with FIG. 4a disposed to the left of FIG. 4b are a schematic logic diagram illustrating the control circuitry within the expansion port.
Figure 4B:
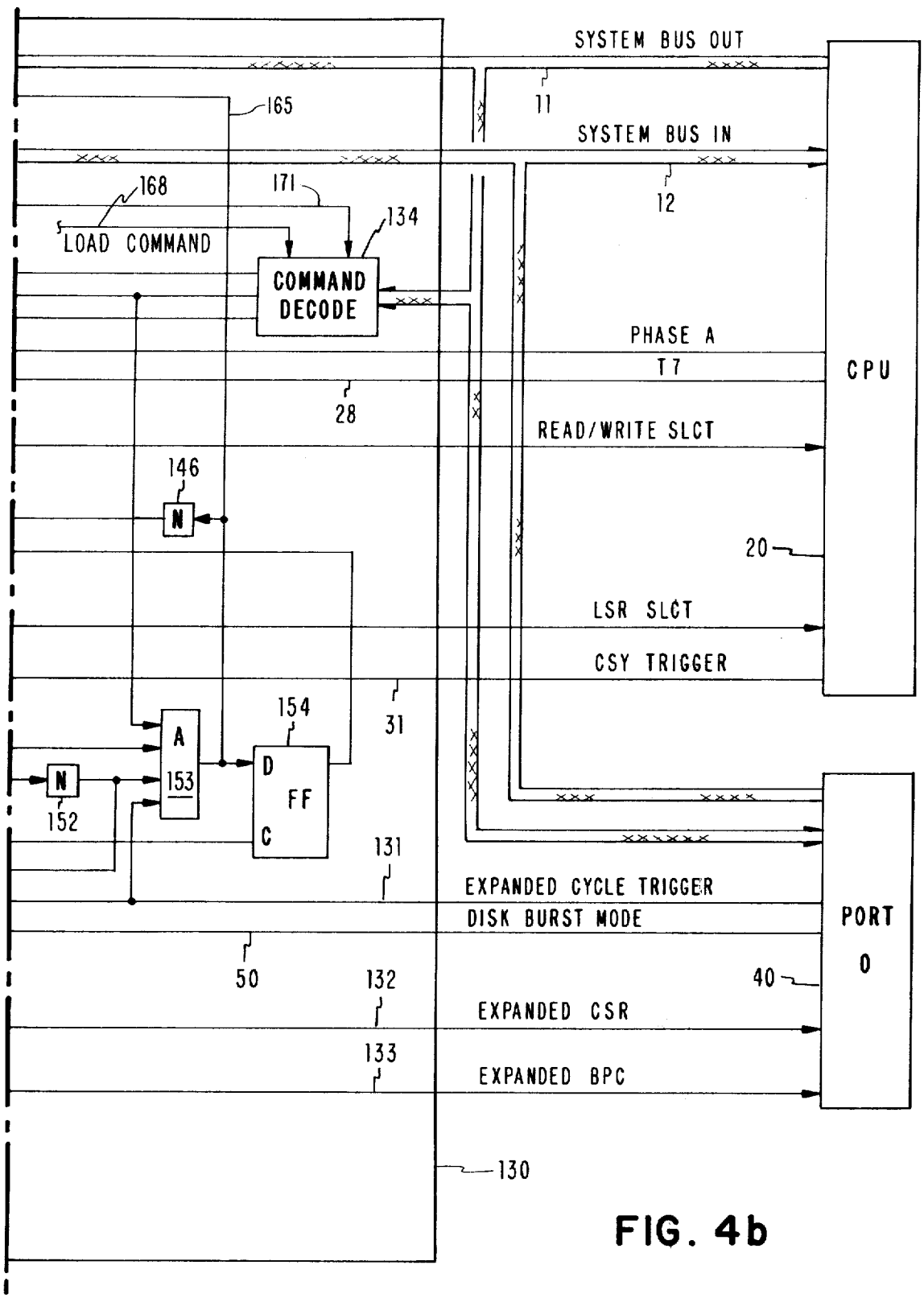

Port 130 includes control circuitry necessary to request and process storage cycle steal operations for the I/O device and attachment 180 as shown in FIG. 4. A read or Write Command applied to expansion port 130 over system bus out 11 is decoded in command decode logic 134 after having been loaded under control of a Load Command signal on line 168. The command decode logic 134 generates a Select I/O attach signal on line 135 which is passed to the I/O device 180 along with the appropriate tag line to identify the direction of data transfer (write call signal on line 136 for passing data to the I/O device; read call signal on line 137 for passing data from the I/O device to storage).

When the I/O device 180 is ready for the data transfer operation, it passes an I/O Selected signal on line 138 which is ANDed by AND circuit 140 with the OR of Write Call on line 136 and Read Call on line 137 via OR circuit 139. The output of AND circuit 140 is an expanded BPC signal on line 133. If the burst mode attachment 75 is not operating in the burst mode, the expanded BPC signal on line is passed as a Block Processor Clock signal by OR circuit 43, FIG. 2, to stop the CPU clocks 21 as previously described. When the CPU clocks 21 have stopped, the T7 signal on line 28 is generated in the CPU, as previously described, to indicate that it is ready to perform storage cycle steal operations. If the burst mode attachment 75 of FIG. 1 is already operating in the burst mode, T7 is already active and the I/O device and attachment 180 has its requests honored via the allow function already described.

AND circuit 140 also functions to condition AND circuit 114. AND circuit 144 also receives the T7 signal, a signal from inverter 169, and a Service Request signal on line 143. Inverter 169 receives its input from latch 158 which has been reset prior to the start of the storage cycle steal operation via inverter 156 when the select I/O attach signal on line 135 was inactive. When I/O device and attachment 180 is ready for the storage cycle steal operation, it activiates the Service Request signal on line 143 to AND circuit 144 which then generates the Expanded CSR signal on line 132 to port 40. The expanded cycle trigger signal on line 131 from port 40 indicates the operation in process belongs to the expansion port 130 as previously described. The Expanded Cycle Trigger signal feeds AND circuits 141 and 142 which are used to generate the Read/Write Select and LSR Select signals respectively. These AND circuits also receive gating signals from AND circuit 140 and inverter 145, which is active when burst mode signal on line 50 is inactive. AND circuit 142 is active, therefore, when the expanded cycle trigger signal on line 131 is active. AND circuit 141 receives a read call signal over line 137. Therefore, the Read/Write Select signal is only activated during expanded cycle trigger time if the operation is a read operation.

If the operation is a read data operation, the I/O device and attachment 180 places a byte of data to be transferred onto data bus in 167 prior to generating a Service Request signal on line 143. Port 130 then generates a Read Strobe signal via AND circuit 155 which receives a Service Request signal on line 143, a Phase A signal, a read call signal on line 137, and a signal from inverter 152 which is active whenever CSY trigger signal on line 31 is not active. The read strobe signal gates the data byte through AND circuit 147 into a data transfer register 148. The data is subsequently gated onto system bus in 12 via AND circuit 170 which is controlled by the expanded cycle trigger signal on line 131. A service response signal on line 162 is then passed to the I/O device and attachment 180 via OR circuit 159 from AND circuit 160 which receives the read call signal on line 137, the CSY trigger signal on line 31, and expanded cycle trigger signal on line 131. The service response signal indicates to the I/O device and attachment 180 that the data byte has been received and that the next byte can be put onto data bus in 167. The data byte placed onto system bus in 12 is written into storage during CSY trigger time.

The process described continues until the I/O device and attachment 180 determines that the storage cycle being taken is for the last byte for the operation. It then passes a last cycle signal on line 163 which feeds AND circuit 157 for setting latch 158. AND circuit 157, also receives the CSY trigger signal on line 31 and an expanded cycle trigger signal on line 131. The set output of latch 158 deconditions AND circuit 144 via inverter 169 to prevent port 130 from requesting any more cycles, because the expanded CSR signal will not be available on line 132.

A similar sequence takes place if the operation is a write operation. In this case a port storage strobe trigger 151 is clocked on via inverter 150 when the CSY trigger signal is active. Inverter 150 receives phase A signal. The output of trigger 151 feeds AND circuit 153 which controls the data input of trigger 154. AND circuit 153 also receives the expanded cycle trigger signal, the write call signal, and a signal from inverter 152. AND circuit 141 is inactive at this time since the operation is a write operation; hence the storage cycle occurring at this time is used by the CPU 20 to place a byte of data onto system bus out 11 at the end of CSY trigger time. When CSY trigger turns off, inverter 152 is active. AND circuit 153 is responsive to generate a write strobe signal on line 165.

The write strobe signal gates the data byte present on system bus out 11 through AND gate 149 into data transfer register 148, to make the data byte available on data bus out 166. The write strobe signal also conditions the data input to trigger 154 which feeds AND circuit 161. Since a write operation is in progress, AND circuit 160 has been degated and no service response signal has been generated, thus far, in response to the service request signal on line 143. At the end of the first Phase A pulse following the termination of the CSY trigger signal, trigger 151 is clocked to the reset state and trigger 154 is clocked to the set state. Therefore, the write strobe signal is no longer present, and AND circuit 161 is conditioned via inverter 146. AND circuit 161 also receives a write call signal on line 136, a signal from trigger 154, and an expanded cycle trigger signal on line 131. AND circuit 161 passes a service response signal on line 162 via OR circuit 159. This signal lasts until either the expanded cycle trigger signal is terminated by port 40 or trigger 154 is reset. Trigger 154 is reset by the next Phase A clock pulse since the data input to the trigger 154 is no longer present from AND circuit 153.

The described operation continues until the I/O device and attachment 180 determines that the last cycle has been reached. The operation is then stopped as previously described for the read operation.

When the operation is completed, the I/O device and attachment 180 generates an op end signal on line 171 to the command decode logic 134 which, in turn, terminates the select I/O attach signal on line 135 and the write call and read call signals on lines 136 and 137 respectively. This results in termination of the expanded PBC signal on line 133. The expanded cycle trigger signal on line 131 has been terminated as described. The CPU 20 then terminates the T7 signal and resumes processing instructions provided, of course, that the burst mode device attachment 75 is not still operating in the burst mode. If it is, the T7 signal remains active, and the CPU 20 remains dedicated to the burst mode device attachment 75.

Figure 6:
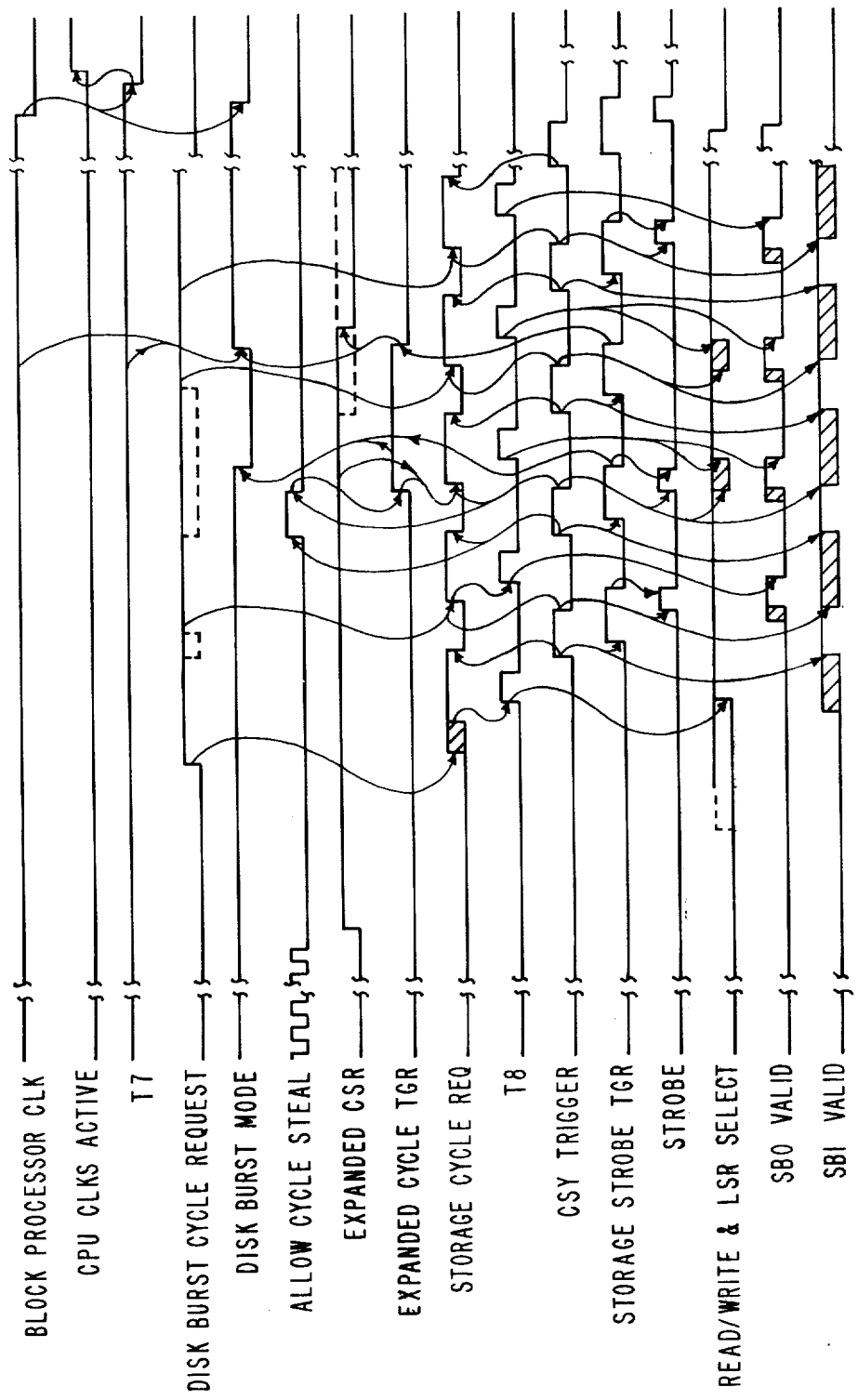
FIG. 6 is a timing diagram illustrating the timing relationships where the burst mode device is requesting and receiving storage cycles at a maximum data rate.

The timing diagram in FIG. 6 illustrates the condition where the disk storage drive 125 is operating in the burst mode and is requesting and receiving storage cycles at a maxiumum data rate. Note that the block processor clock signal is present for the entire operation. The CPU clocks and controls 23 are inactive; however, the T7 signal is present. Allow cycle steal signals are made available prior to the presence of the burst cycle request signal. In this instance an expanded cycle steal request is made after the first two allow cycle steal signals have been generated. The expanded cycle steal request signal remains present but a storage cycle is not granted until the allow cycle steal signal is again generated. In the meantime, storage cycles are taken to service the disk storage drive 125. The I/O device and attachment 180 then gets a storage cycle and the next ensuing storage cycle is again taken by the disk storage drive 125.

Figure 7:
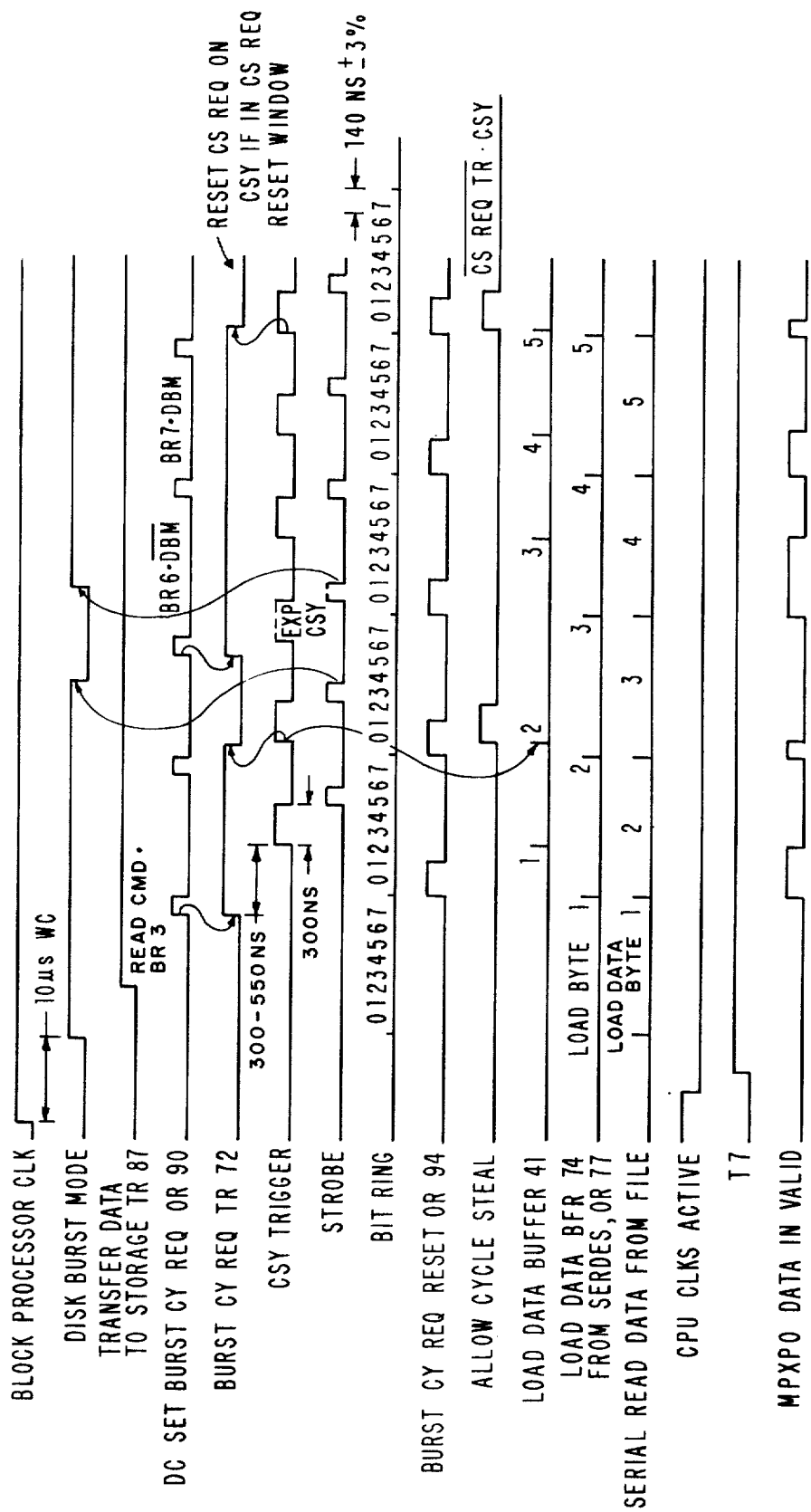
FIG. 7 is a timing diagram illustrating timing conditions when the burst mode device attachment is operating to transfer data to storage.
Figure 9:
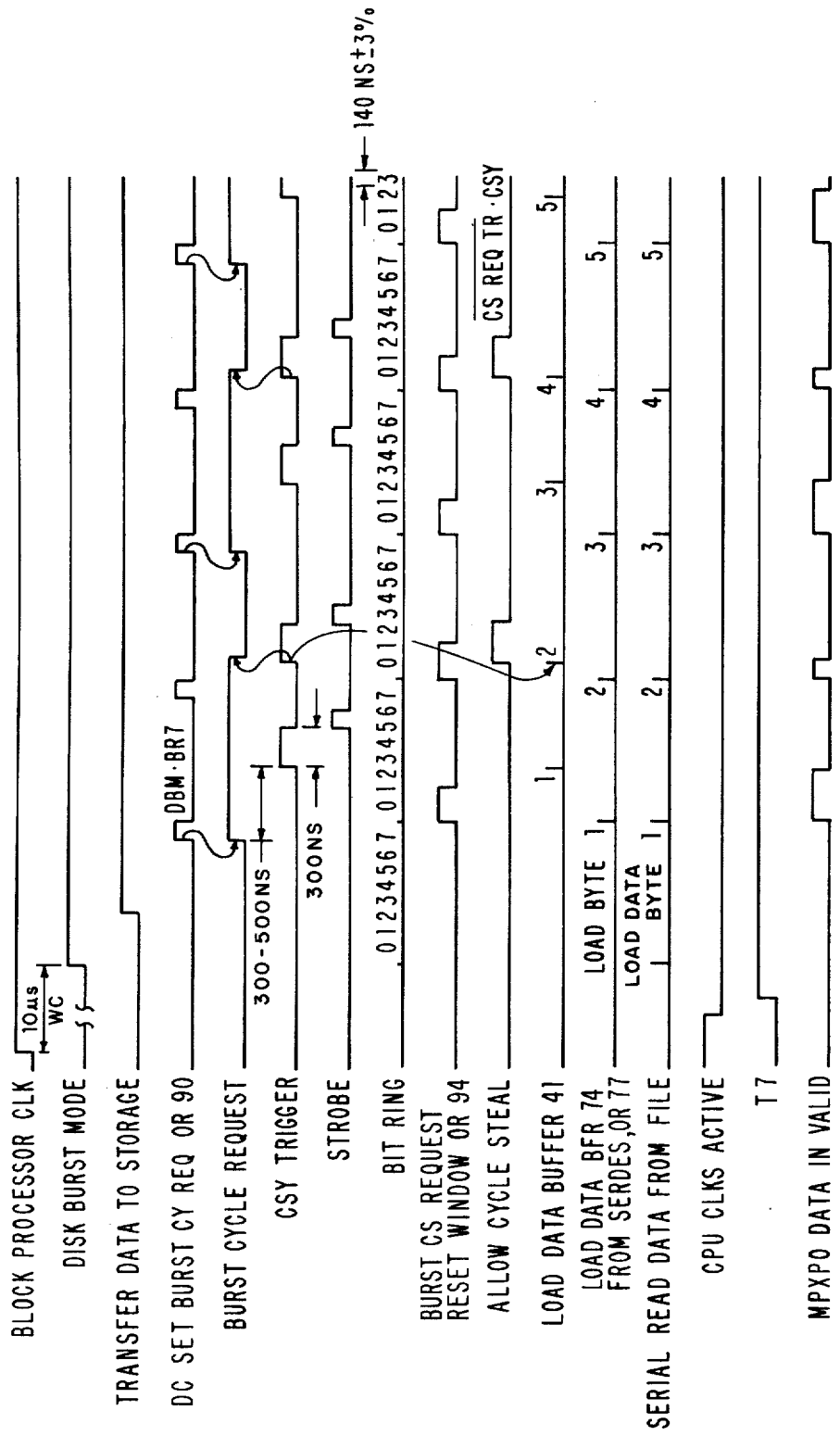
FIG. 9 is a timing diagram illustrating timing conditions where the relinquished storage cycle is not used.

The timing diagram of FIG. 7 represents the condition where the disk storage drive 125 is operating in the burst mode to read data and transfer the same to storage 10. The block processor clock signal is present for the entire read operation. The disk burst mode signal is also present for the entire operation unless the I/O device and attachment 180 uses the relinquished storage cycle. The transfer data to storage trigger 87 is set at bit ring position 3 time. The burst cycle request trigger becomes and remains set whereby successive storage cycles are requested and taken. Note that the burst cycle request trigger resets so as to relinquish a storage cycle. In order for the relinquished storage cycle to be used, the CSY trigger signal must occur during the time that there is an output signal from OR circuit 94. The serial data read from the disk storage drive 125 is entered into Serdes 111 and then loaded into data buffer 74. The byte of data in buffer 74 is transferred to buffer 41 in port 40. The byte of data is valid on MPXPO Data In bus 17 between the times buffers 74 and 41 are loaded. The timing diagram in FIG. 9 is like that in FIG. 7 except that the relinquished cycle is not used by the I/O device and attachment 180.

Figure 8:
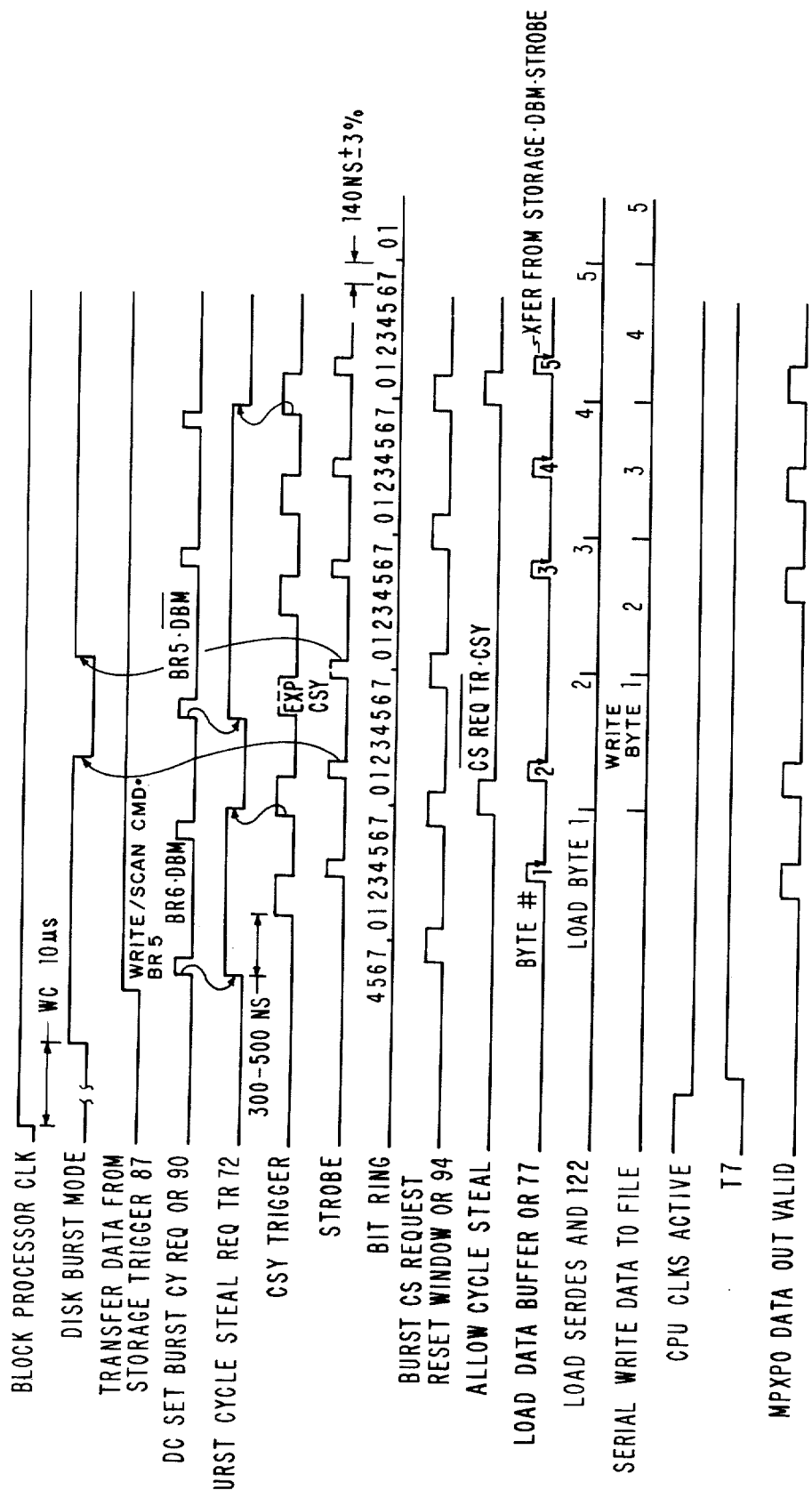
FIG. 8 is a timing device illustrating timing conditions, when the burst mode device attachment is operating to transfer data from storage.

The timing diagram in FIG. 8 illustrates the condition where data is being transferred from storage to the disk storage drive 125 while it is operating in a burst mode to write data. In this instance, the burst cycle request signal is present so as to request successive storage cycles and then it is reset so as to relinquish the next storage cycle. After the relinquished storage cycle has elapsed, the burst cycle request signal is again present to request the next storage cycle for transferring data to the disk storage drive 125.

Figure 10:
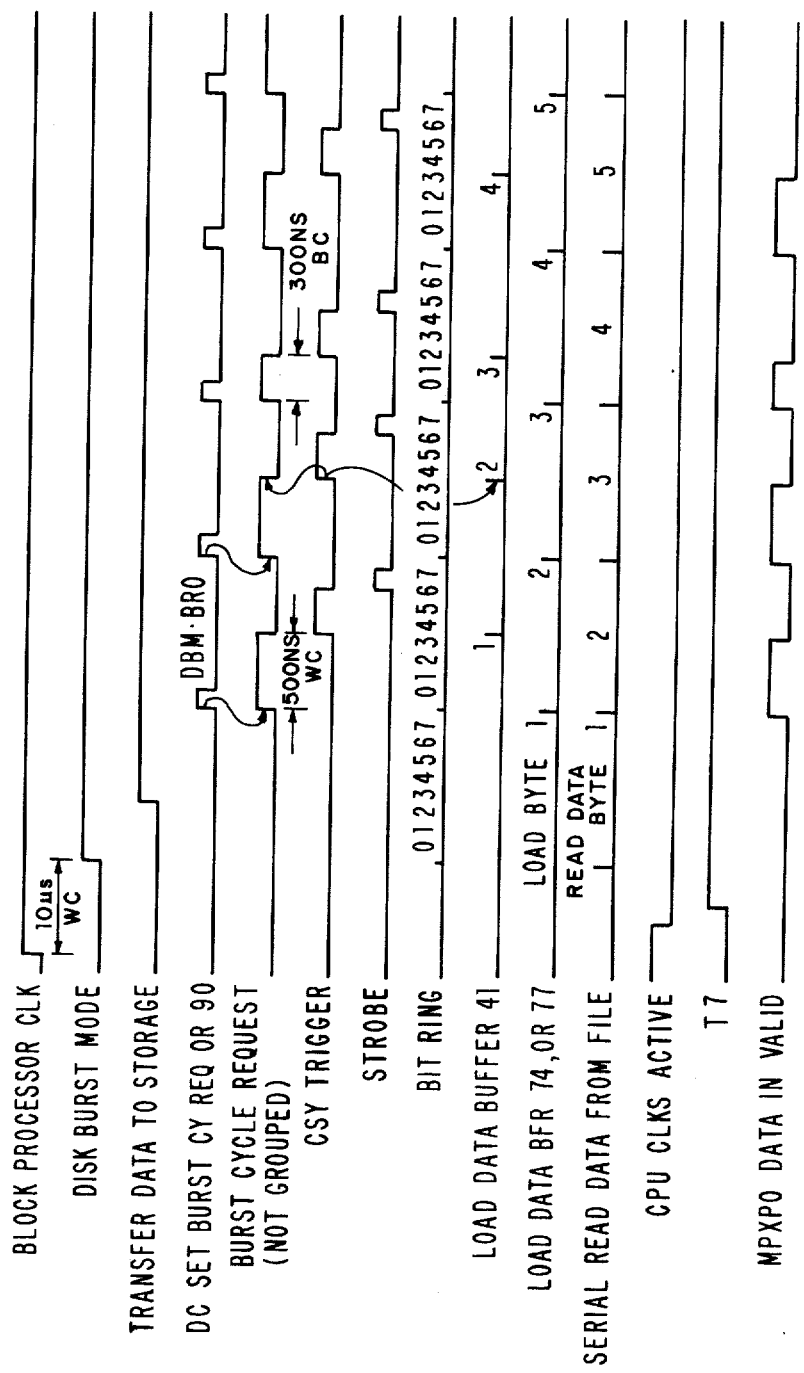
FIG. 10 is a timing diagram illustrating the timing conditions when the burst mode device attachment is not grouping storage cycle requests.

The timing diagram of FIG. 10 illustrates burst mode operation where the burst cycle requests are not grouped as in the present invention and hence, no other I/O device is allowed to cycle steal. It aids in illustrating the significant advantages of the present invention.

What is claimed is:

1. In a computer system including storage, central processing unit and I/O devices, said central processing unit being connected to said storage and to said I/O devices, said central processing unit including means for controlling the operation of said storage, and further including means for granting storage cycles to said I/O devices, at least one I/O device being connected to selectively operate in a dedicated mode, whereby said CPU grants successive storage cycles thereto without interruption, and at least one I/O device being connected to selectively operate in a non-dedicated mode, whereby storage cycles are granted thereto by said CPU when said I/O device operating in a dedicated mode is not operating or when said I/O device operating in a dedicated mode yields an allocated storage cycle while continuing to operate in said dedicated mode, the improvement comprising:

means for detecting when said I/O device operating in a dedicated mode is unable to use the next occurring storage cycle, means for generating an allow signal in response to detecting when said I/O device operating in a dedicated mode is unable to use the next occurring storage cycle, and means responsive to said allow signal for granting said next occurring storage cycle to said I/O device operating in said non-dedicated mode while said I/O device operating in said dedicated mode remains in said dedicated mode.

2. The computer system of claim 1 further comprising:

means for selectively granting storage cycles to said I/O device operating in a non-dedicated mode when said I/O device connected to selectively operate in a dedicated mode is not operating.

3. The computer system of claim 1 wherein said means for detecting when said I/O device operating in a dedicated mode is unable to use the next occurring storage cycle comprises, means for generating a time slot related to the operation of said I/O device operating in a dedicated mode, and logic means responsive to said time slot and to a timing signal related to operation of said storage for generating a signal indicating that said I/O device operating in a dedicated mode is unable to use the next occurring storage cycle and that the next occurring storage cycle is for said non-dedicated I/O device.

4. The computer system of claim 3 wherein said means for generating a time slot generates said time slot at one period of time in relationship to operation of said I/O device operating in a dedicated mode when data is to be transferred from said storage to said I/O device operating in a dedicated mode.

5. The computer system of claim 3 wherein said means for generating a time slot generates said time slot at another period of time in relationship to operation of said I/O device operating in a dedicated mode when data is to be transferred from said I/o device operating in a dedicated mode to said storage.

6. The computer system of claim 1 further comprising means for restoring access to storage cycles to said I/O device operating in said dedicated mode after said I/O device operating in said non-dedicated mode has taken said granted storage cycle.

7. In a computer system including storage, a central processing unit, and I/O devices, said central processing unit being connected to said storage and to said I/O devices, said central processing unit including means for controlling the operation of said storage, and further including means for initiating the operation of said I/O devices and granting storage cycles thereto at least one I/O device being connected to selectively operate in a dedicated mode, whereby said central processing unit grants successive storage cycles thereto without interruption, and at least another I/O device being connected to selectively operate in a non-dedicated mode, whereby storage cycles are granted thereto by said central processing unit in the absence of said one I/O device operating in a dedicated mode or when said one I/O device operating in a dedicated mode yields a granted storage cycle while continuing to operate in said dedicated mode, the improvement comprising:

means for generating a clock control signal when said one I/O device is selected to operate, means within said central processing unit responsive to said clock control signal for generating timing signals to enable said one I/O device to be set into said dedicated mode, said one I/O device upon being set into said dedicated mode provides a signal for requesting storage cycles, and logic means operable during a predetermined time after said one I/O device has been set into said dedicated mode to inhibit said request of storage cycles and provide an allow signal to enable said another I/O device to request storage cycles.

8. The computer system of claim 7 wherein said predetermined time for inhibiting said request of storage cycles is set by logic means indicating that data is to transfer from said storage to said one I/O device and by one of said timing signals.

9. The computer system of claim 7 where said predetermined time for inhibiting said request of storage cycles is set by logic means indicating that data is to transfer from said one I/O device to said storage and by one of said timing signals.

10. The computer system of claim 7 further comprising means within said another I/O device for generating said clock control signal when said another I/O device is selected to operate whereby said means within said central processing unit generates said timing signals in response to said clock control signal to enable said another I/O device to be set into said non-dedicated mode, said another I/O device upon being set into said non-dedicated mode provides a signal for requesting storage cycles.

11. In a computer system including storage for storing data and instructions, a central processing unit connected to said storage to control the operation thereof and for processing instructions and data, an I/O port connected to said central processing unit for transferring data and commands to and from said central processing unit, a burst mode I/O device attachment connected to said I/O port for transferring data and commands between said burst mode I/O device attachment and said I/O port said burst mode I/O device attachment being granted by said central processing unit, successive storage cycles without interruption, a burst mode I/O device connected to said burst mode I/O device attachment for receiving data and control signals therefrom and transferring data and status signals thereto and a non-burst mode I/O device and attachment attached to said I/O port, said non-burst mode I/O device and attachment being granted storage cycles by said central processing unit in the absence of said burst mode I/O device attachment operating or when said burst mode I/O device attachment yields a granted storage cycle the improvement comprising:

means in said burst mode device attachment for generating a clock control signal in response to a command,
  first means in said I/O port for passing said clock control signal to said central processing unit,
  means in said central processing unit responsive to said clock control signal for generating timing signals,
  means for applying said timing signals to said I/O port, to said burst mode I/O device attachment and to said non-burst mode I/O device and attachment,
  second means in said I/O port responsive to said clock control signal and one of said timing signals for generating a burst mode signal and passing the same to said burst mode I/O device attachment,
  logic means in said burst mode I/O device attachment responsive to said burst mode signal for generating a burst cycle request signal,
  storage cycle request logic means in said I/O port responsive to said burst cycle request signal for generating a storage cycle request signal,
  means in said central processing unit responsive to said storage cycle request signal for providing an address select signal to said storage,
  means in said burst mode I/O device attachment responsive during a predetermined time to one of said timing signals from said central processing unit for inhibiting generation of said burst cycle request signal and generating an allow signal,
  means in said I/O port responsive to said allow signal for generating a non-burst mode control signal and applying the same to said non-burst mode I/O device and attachment whereby said non-burst mode I/O device and attachment is signalled that it can have access to the next storage cycle,
  said storage cycle request logic means in said I/O port being responsive to said non-burst mode control signal to generate a storage cycle request.

12. The computer system of claim 11 further comprising
  means in said I/O port responsive to timing signals from said central processing unit for generating a burst mode restore signal, and
  means for appying said burst mode restore signal to said second means in said I/O port to cause the same to generate said burst mode signal whereby said burst mode I/O device attachment resumes control for requesting ensuing storage cycles.

* * * * *